Aug. 4, 1931.  E. DUCHESNE  1,817,133
STAY BOLT TAP
Filed Dec. 31, 1929
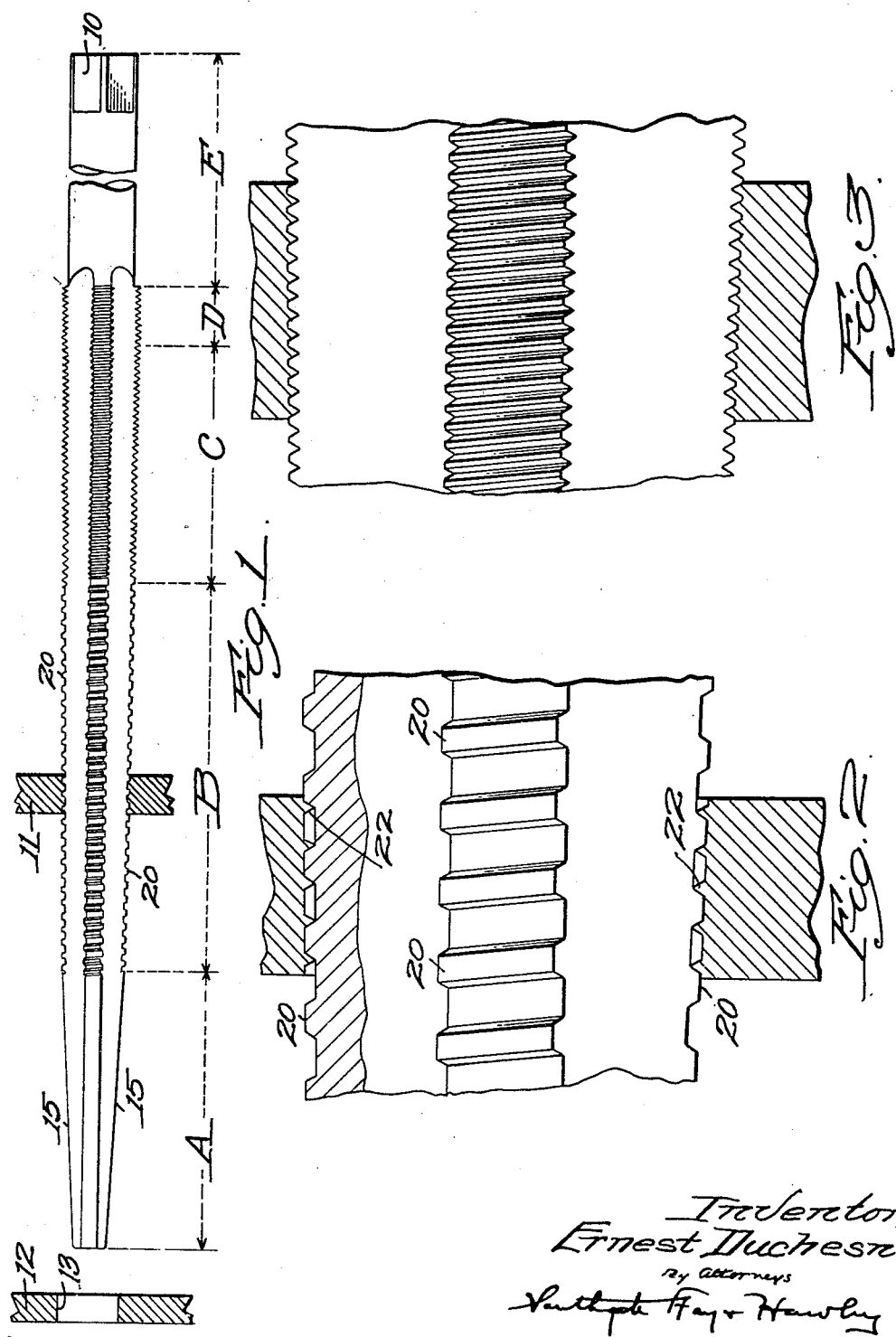
Inventor
Ernest Duchesne
By Attorneys Patented Aug. 4, 1931

1,817,133

UNITED STATES PATENT OFFICE

ERNEST DUCHESNE, OF SCHENECTADY, NEW YORK, ASSIGNOR TO GREENFIELD TAP & DIE CORPORATION, OF GREENFIELD, MASSACHUSETTS, A CORPORATION OF MASSACHUSETTS

STAY BOLT TAP

Application filed December 31, 1929. Serial No. 417,780.

This invention relates to taps used in reaming and threading holes to receive staybolts in certain types of boilers and in other similar structures. These staybolt taps are used where two sheets or layers of boiler plate are arranged in definitely spaced relation and where roughly aligned holes are provided in the two spaced sheets.

It is essential that a full and perfect thread be produced in each hole and that these threads be accurately aligned and accurately in lead with each other.

It is the general object of my invention to improve the construction of staybolt taps as previously made, by which improvements important advantages are attained.

To the attainment of this object, an important feature of my invention relates to the provision of a staybolt tap having a combined reaming and preliminary threading section.

A further feature is to so combine said reaming and preliminary threading section with a tapered pilot section, a tapered threading section, and a full thread section that effective and accurate tapping operations may be performed.

My improved tap may be of substantially reduced length as compared with the usual staybolt tap and this reduction in length results in substantial economies and advantages, as will be hereinafter explained.

My invention further relates to the arrangement of parts hereinafter described and more fully set forth in the appended claims.

A preferred form of the invention is shown in the drawings, in which

Fig. 1 is a side elevation of my improved staybolt tap;

Fig. 2 is an enlarged detail side elevation, partly in section, of a portion of the combined reaming and preliminary threading section; and Fig. 3 is a partial side elevation of a portion of the tapered threading section.

Referring to the drawings, my improved staybolt tap comprises a tapered pilot and reaming section A, a combined reaming and preliminary threading section B, a tapered threading section C, a full thread section D and a handle or shank portion E. The tap is fluted throughout its length to provide the usual separated lands and the end of the shank E may be squared, as indicated at 10, to receive a wrench or handle.

The type of work for which my improved tap is designed is indicated by the spaced metal plates 11 and 12, having roughly aligned openings 13 therein.

The pilot section A is somewhat abruptly tapered and is provided with reaming blades or edges 15. The reaming and preliminary threading section B is provided with teeth 20 alternately disposed on successive lands, producing a so-called "skip-tooth" arrangement.

The teeth 20 are relatively wide but of slight height, so that the thread 22 produced thereby is of slight cross section and appears in the reamed hole as a small sharp spiral rib on the inner surface of the hole. The roots of the teeth 20 are disposed parallel to the general taper of the section B.

The tapered threading section C is cut to uniform diameter at the roots of the threads but the tops of the threads gradually increase in diameter to full thread size. The finishing section D is provided with full threads throughout.

Having described the construction of my improved staybolt tap, the method of use and advantages thereof are as follows:

The pilot section A, being first inserted, reams the first hole to such size as to afford entrance for the reaming and preliminary threaded section B. The teeth in the section B gradually increase in diameter, both at the tops and the roots of the threads, but the threads do not themselves increase in height. This section of the tap performs a reaming operation but at the same time forms a preliminary thread or spiral guiding rib 22 for the tapered tapping portion.

This spiral guiding rib 22 performs a very important function, as it causes the tap to "lead-in" to the hole without requiring the application of undue axial pressure thereon. When the pilot section A enters the second hole, the reaming of the first hole is still in progress, and the first hole and spiral rib 22 are then accurately aligned with the second hole.

As the tap is entered further in the hole 13 of the second plate 12, the skip teeth 20 form a second preliminary thread or spiral rib therein which is in exact lead with the thread or rib 22 already formed in the hole in the plate 11. This results from the fact that the lead is the same throughout the length of the tap and that the tapered threading section is still in engagement with the plate 11 when the teeth 20 of the section B engage the hole 13 in the plate 12.

This construction of staybolt tap permits a substantial reduction in length over the taps previously used, as it was customary in such taps to provide a very long tapered reaming section by which the holes were reamed to full size before the threading began, whereas in my improved tap only a short and abruptly tapered pilot and preliminary reaming section is provided, while the greater part of the reaming is done simultaneously with the preliminary threading.

This shortening of the tap permits the use of high speed steels and special alloys by which the effective life of the tap is very greatly increased and the quality of work produced is correspondingly improved.

Having thus described my invention and the advantages thereof, I do not wish to be limited to the details herein disclosed, otherwise than as set forth in the claims, but what I claim is:—

1. A staybolt tap comprising an abruptly tapered pilot and preliminary reaming section, a less abruptly tapered reaming and preliminary threading section for reaming a hole parallel to the axis thereof, and effective to form a thread during the reaming operation, a tapered threading section having teeth progressively increasing in height to full cross section, and a full thread finishing section.

2. A staybolt tap having pilot, reaming, and threading sections, said reaming section having teeth shaped and disposed to enlarge a hole to correct tapping diameter by reaming parallel to the axis of the hole, and to provide simultaneously with the reaming operation, a rudimentary thread in said hole effective to lead-in the tap.

3. A staybolt tap having pilot, reaming, and threading sections, said reaming section having teeth alternately arranged on successive lands and axially spaced, and said teeth being effective to ream a hole parallel to the axis thereof and to form, simultaneously with the reaming operation, a rudimentary thread of correct lead in the reamed hole.

4. A staybolt tap as set forth in claim 3, in which the alternately arranged teeth are of wide face and relatively slight height and are effective to produce said rudimentary thread in the form of a spiral rib of slight section on the inside of the reamed hole.

In testimony whereof I have hereunto affixed my signature.

ERNEST DUCHESNE.